United States Patent [19]

Domke

[11] Patent Number: 5,127,624
[45] Date of Patent: Jul. 7, 1992

[54] THREADED SLEEVE ASSEMBLY

[75] Inventor: Robert A. Domke, Glastonbury, Conn.

[73] Assignee: Honeywell Inc., Minneapolis, Minn.

[21] Appl. No.: 693,752

[22] Filed: Apr. 30, 1991

[51] Int. Cl.⁵ .............................................. F16K 31/06
[52] U.S. Cl. ........................... 251/129.15; 137/625.65; 29/890.13
[58] Field of Search ............... 251/129.15; 137/625.65; 29/890.13

[56] References Cited

U.S. PATENT DOCUMENTS

| 4,149,699 | 4/1979 | Speckmann . | |
| 4,783,044 | 11/1988 | Ellison | 251/129.15 X |
| 4,844,411 | 7/1989 | Nelson . | |
| 4,856,756 | 8/1989 | Combs . | |
| 4,967,996 | 11/1990 | Sonoda et al. | 251/129.15 X |
| 4,991,654 | 2/1991 | Brandell et al. . | |

OTHER PUBLICATIONS

"Engineering Information", Skinner Precision Industries, Inc. (*Honeywell*), (not dated).

"Skinner Valve Technical Reference Manual", *Honeywell Inc.*, 1990.

"Birthplace of an Eyelet Machine", Deep Drawing and Eyelet Technology Design Manual, *Risdon Corporation*, 1982.

*Primary Examiner*—Arnold Rosenthal
*Attorney, Agent, or Firm*—Ian D. MacKinnon

[57] ABSTRACT

An improved solenoid valve wherein the improvement is an improved sleeve assembly. The sleeve assembly is a tubular section having an enlarged first end integrally formed with the remainder of the tubular section and having a second end. The enlarged end is formed with external threads which mate with threads of a cup-like recess in the body of the solenoid valve. The tubular section is a nonmagnetic material which is screwed into the cup-like recess of the body. The enlarged first end further has a gasket seat for compressing a gasket between the cup-like recess of the body and the sleeve member. A stop of magnetic material is welded to the second end of the tubular section forming a seal. A flux plate comprising a magnetic material is located about the sleeve assembly between an electrical coil and the body.

3 Claims, 4 Drawing Sheets

THREADED SLEEVE ASSEMBLY

BACKGROUND OF THE INVENTION

This invention is in the field of electrically operated valves or solenoid valves. More specifically, the invention is a solenoid valve incorporating an improved sleeve assembly.

Solenoid valves are well developed in the art. A basic solenoid valve is an electromagnet so arranged that when current is applied to an electrical coil (when the valve is "energized") a plunger either opens or seals an orifice, thereby controlling the flow of fluid. The simplest solenoid valve has four basic functional parts: a solenoid coil, a valve body, a sleeve assembly and a plunger or armature. The coil surrounds the plunger which may have an insert of a soft synthetic material at one end. The valve body has an orifice which is sealed by the insert in the plunger. The orifice is opened or closed by movement of the plunger. The coil causes the plunger to move when the coil is energized. When the coil is de-energized the plunger is returned to its original position by means of a spring. When current flows through a coil of wire it produces a magnetic field around it. The strength of this magnetic flux depends upon the amount of current flowing and the number of turns in the wire.

The prior art sleeve assembly comprises a tube generally manufactured from nonmagnetic stainless steel which is welded into a first end piece, a magnetic stainless steel flange. The first end piece is adapted such that it is screwed into the body and seals the body to the sleeve. The plunger is located on the longitudinal axis of the sleeve and moves along the axis to open and close the valve. The other end of the sleeve has a second end piece welded to the tube. The second end piece, a stop, forms a portion of a path having low magnetic reluctance to form a magnetic path which exists when the solenoid is energized. The prior art three-piece sleeve is of a relatively complex construction and with attendant possibilities of failure. As it is a three-piece sleeve assembly, there is potential weakness at the welded joint where the sleeve is joined to the flange. In common solenoid valve construction, two forces may be imposed upon this first joint. First, the sleeve assembly forms part of a pressure chamber containing fluid which flows through the inlet port. Underwriters Laboratories and Canadian Standards Association requires the sleeve assembly to withstand 5 times the rated pressure of the valve. Secondly, in a number of common valve constructions, the sleeve assembly is often utilized to retain the body and the solenoid coil in place, this construction causes a constant static pressure upon the welded joint. Applicant's invention involves elimination of the welded joint between the tube and the flange. This simplified construction offers the potential for increasing the strength of the solenoid valve and decreasing the cost.

SUMMARY OF THE INVENTION

The invention is an improved electrically operated valve having a body having at least one port with an orifice in a threaded cup-like recess, the recess being centered upon an axis. The cup-like recess accommodates a sleeve member extended along said axis. The sleeve member contains a plunger of magnetic material having a closure member for closing the port, and an electrical coil surrounding the sleeve member for actuating the plunger. The improvement is a sleeve member which is a tubular section having an enlarged first end integrally formed with the remainder of the tubular section and a second end. The enlarged end is formed with external threads which mate with the threads in the cup-like recess of the body. The tubular section is a nonmagnetic material which is screwed into the cup-like recess. The enlarged first end has a gasket seat for compressing a gasket between the cup-like recess and the sleeve member. A stop manufactured from magnetic material is attached to the second end of the tubular section in a manner to form a pressure seal. A flux plate manufactured from a magnetic material may be located about the sleeve assembly between the electrical coil and the body for enhancing the magnetic circuit.

DESCRIPTION OF THE PREFERRED EMBODIMENT

Figure 1:
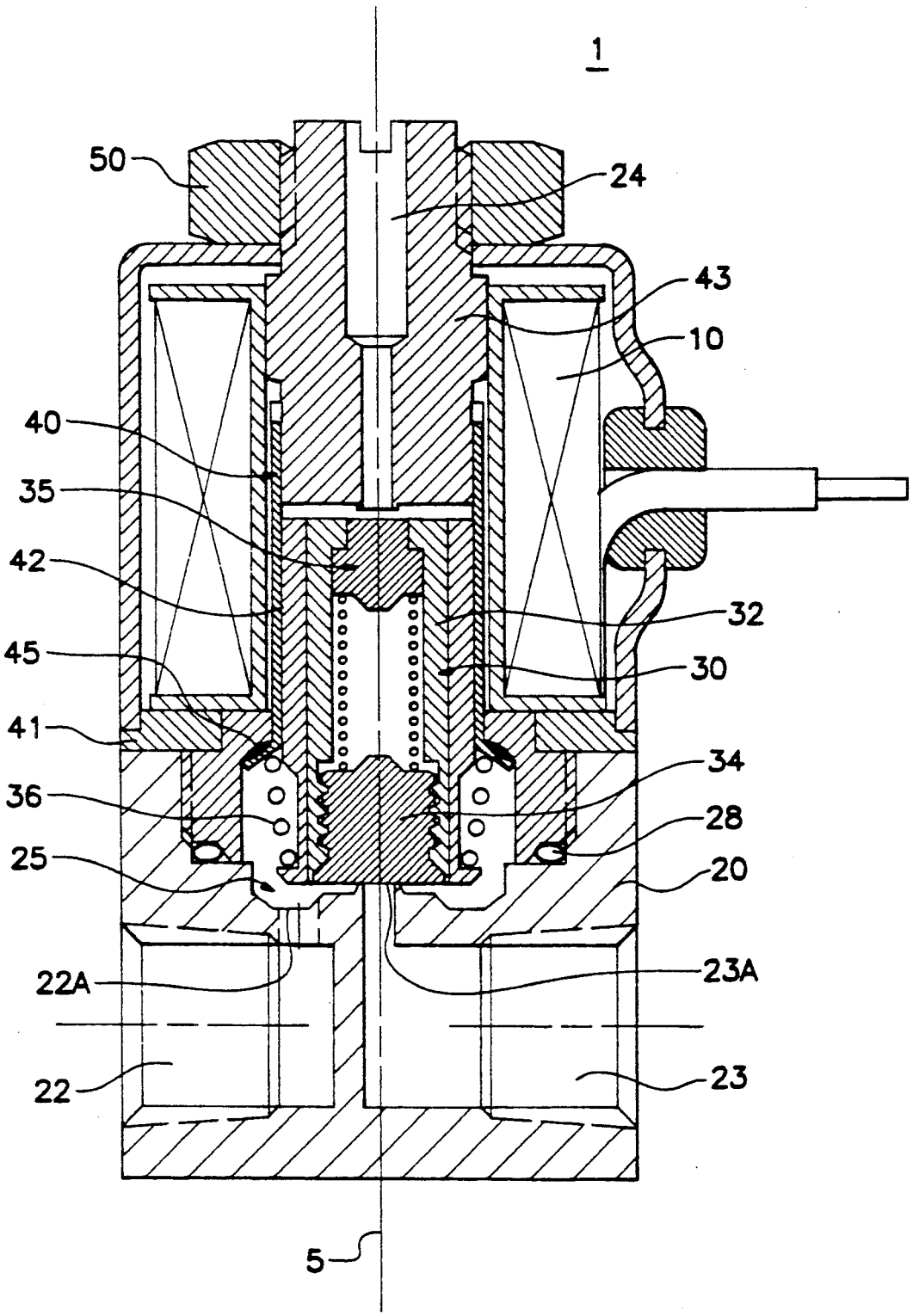
FIG. 1 is a cross-sectional view of a prior art solenoid valve.

Electrically operated valve or solenoid valve 1 of FIG. 1 comprises solenoid coil 10, body 20, plunger 30 and sleeve assembly 40. Prior art sleeve assembly 40 is a three-piece sleeve assembly in which nonmagnetic stainless steel tube 42 is located about longitudinal axis 5 of solenoid valve 1. Tube 42 has a first end and a second end. The first end of tube 42 is welded to retaining means or flange 41. Retaining means 41 is made out of magnetic stainless steel. Retaining means 41 is located about tube 42 and is threaded about its outer annular surface and is adapted to be screwed into body 20. Sleeve assembly 40 further has stop 43 welded to the second end of tube 42. Stop 43 is a magnetic stainless steel such that it forms a portion of a path having low magnetic reluctance to form a magnetic path which exists when solenoid coil 10 is energized. Solenoid coil 10 is located around stop 43 and tube 42 on axis 5.

Figure 2A:
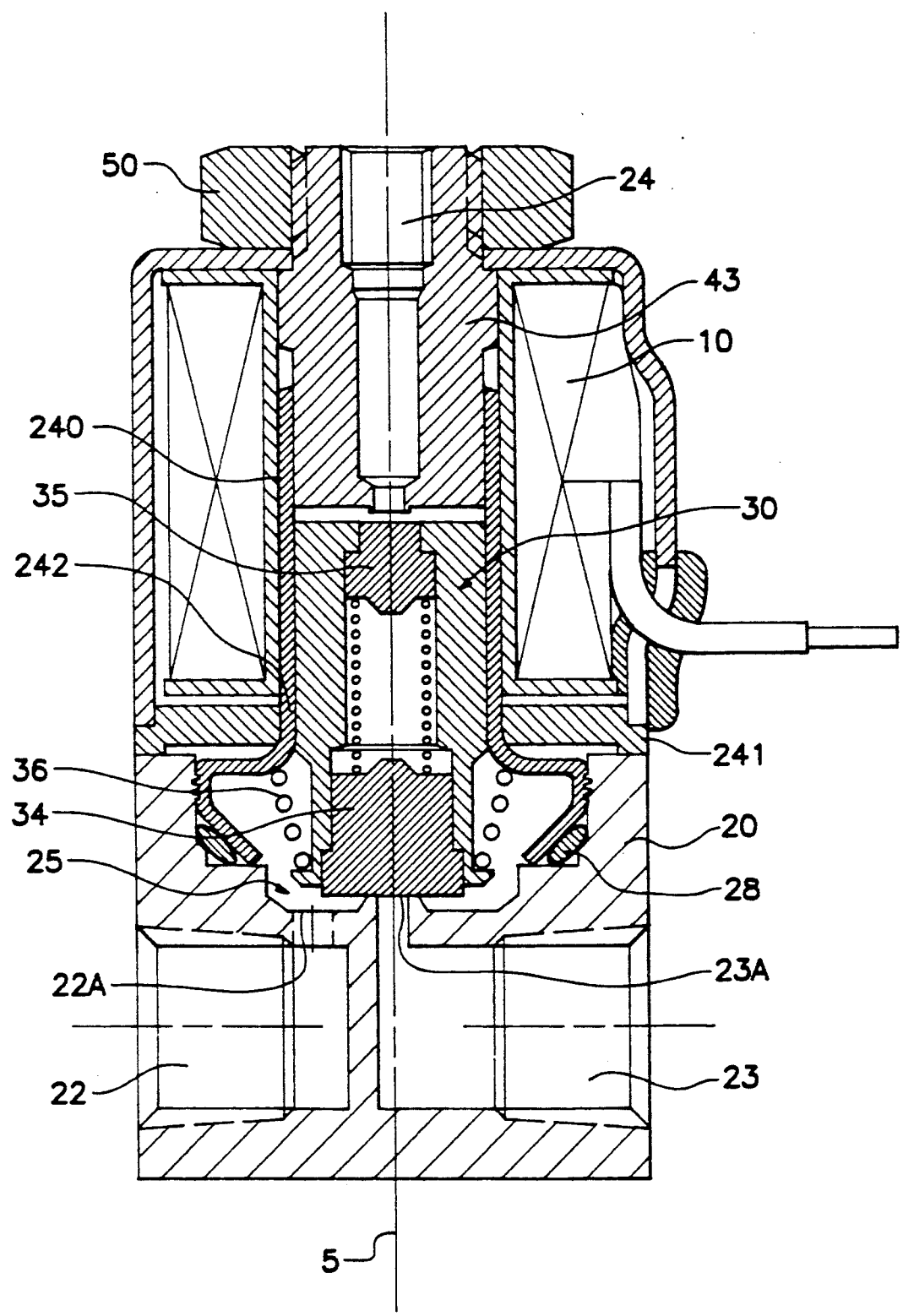
FIGS. 2a and 2b are cross-sectional views of two embodiments of the invention.
Figure 2B:
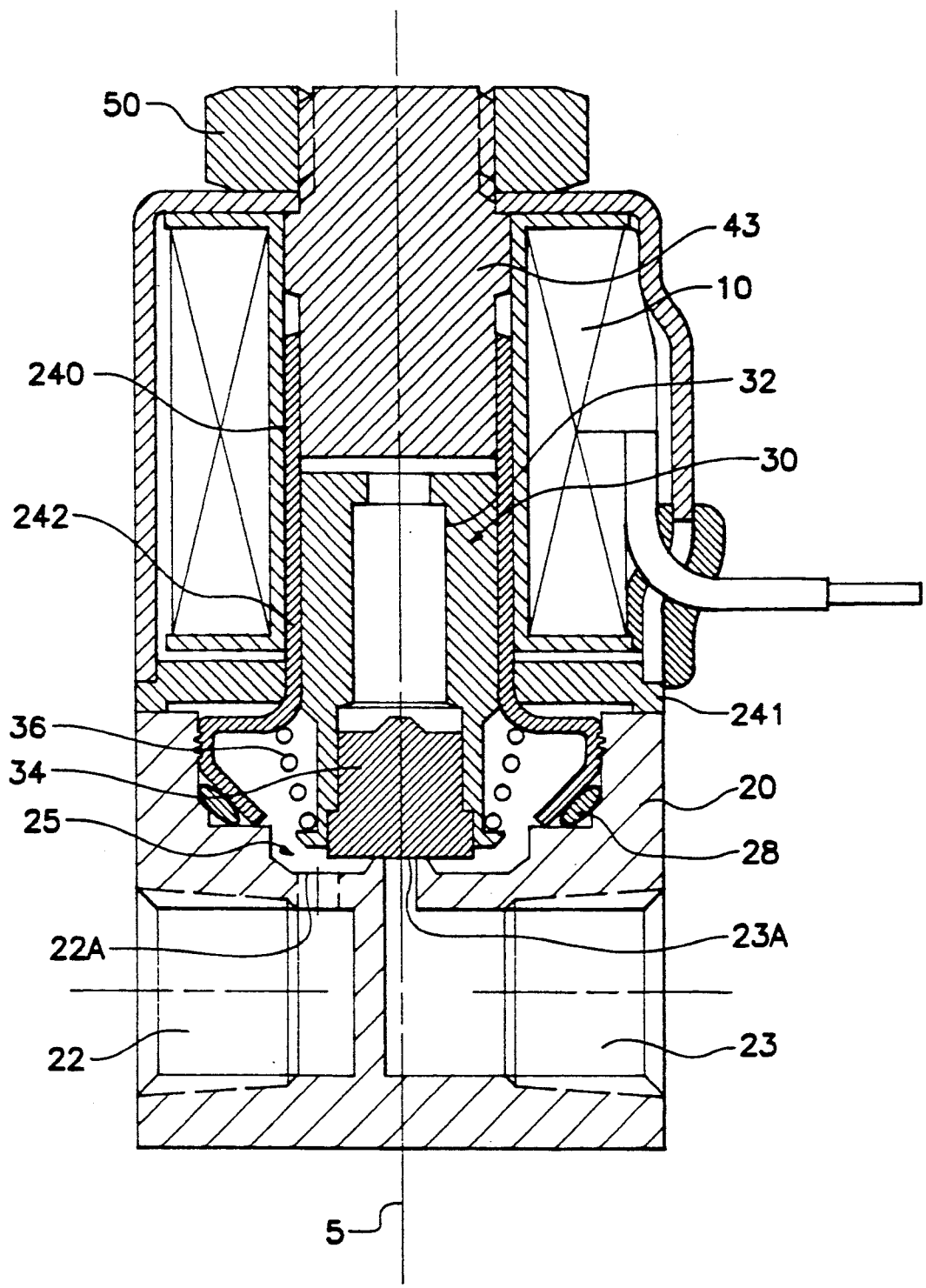

Body 20 contains inlet port 22, outlet port 23 and a cup-like recess 25. It should be noted that the solenoid valve of FIGS. 1, 2a and 2b represents only two of many different solenoid valve configurations. It should be understood that one skilled in the art could adapt the solenoid valve to any number of obvious configurations that still fall within the scope of the present claims. Inlet port 22 and outlet port 23 have orifices 22a and 23a, respectively, in threaded cup-like recess 25. Body 20 is generally manufactured from brass, stainless steel or plastic. Plunger 30 is located within sleeve assembly 40 such that when sleeve assembly 40 is screwed into recess 25 of body 20, plunger 30 may move along axis 5, and is retained within cylinder 42 by stop 43 and recess 25. Body 20 and sleeve assembly 40 are sealed by O-ring or gasket 28 located in recess 25. Inlet port 22 is directed into cup-like recess 25 through inlet orifice 22a such that the fluid may flow around plunger 30, and if solenoid coil 10 is energized, out outlet orifice 23a to outlet port 23. Outlet orifice 23a is perpendicular to and centered on axis 5 such that when solenoid coil 10 is de-energized, plunger 30 seals orifice 23a.

Plunger 30 is adapted to slide within sleeve assembly 40. Plunger 30 further has closure member or valve seal 34 which is utilized to seal orifice 23a of output port 23. Valve seal 34 may be manufactured from Buna-N, Viton or Ethylene Propylene. Secondary port 24 is located in stop 43. Valve seal 35, which may be manufactured from Buna-N, Viton or Ethylene Propylene, is utilized to seal secondary port 24. Spring 36 is located between sleeve assembly 40 and plunger 30 in such a manner that valve seal 34 closes orifice 23a when solenoid coil 10 is not energized.

For solenoid valve 1 as shown in FIG. 1, when solenoid coil 10 is not energized, plunger 30 will close outlet orifice 23a and open secondary port 24 which is located through stop 43. When solenoid 10 is energized, plunger 30 is pulled towards stop 43, closing secondary port 24 located in stop 43 and opening outlet orifice 23a in body 20. In this manner, the fluid is allowed to flow through solenoid valve 1.

Figure 3:
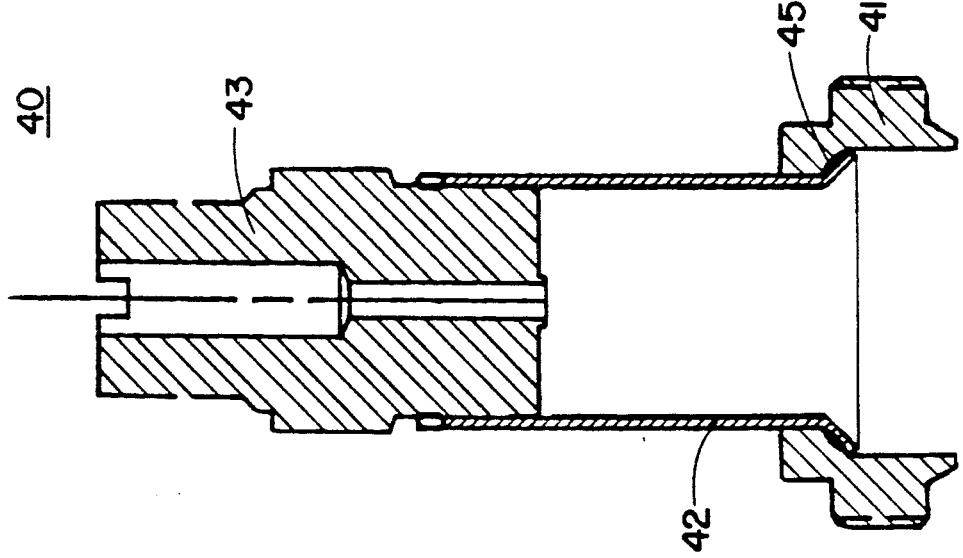
FIG. 3 is a cross-sectional view of a prior art sleeve assembly.

Sleeve assembly 40 of FIG. 1, further illustrated in FIG. 3, comprises three main parts. Tube 42 is constructed of a nonmagnetic stainless steel. Retaining means or flange 41 is constructed from a magnetic stainless steel and is adapted such that it may be screwed into body 20 of FIG. 1. Retaining means 41 is welded at weld joint 45 at the first end of tube 42. Stop 43 is welded to the second end of tube 42 to complete sleeve assembly 40.

Sleeve assembly 40 is subjected to two main forces. The first force, which is imposed upon weld joint 45, is the fluid pressure which is exerted from input port 22. As stated before, sleeve assembly 40 must be able to sustain at least five times the rated pressure for which the valve is designed. The second force, which is imposed upon weld 45, is the static force which is utilized to hold the solenoid valve together. Nut 50 of FIG. 1 is screwed onto the top of stop 43, and retains solenoid coil 10 on tube 42. Retaining means 41 is screwed into body 20 in such a way that body 20 compresses solenoid coil 10 between nut 50 and body 20. Due to this arrangement, weld 45 is also subjected to a constant static force utilized to compress solenoid coil 10 between body 20 and nut 50. Thus, weld 45 is subjected to a fluid pressure and static force which tends to shorten the life of solenoid valve 1 of FIG. 1.

Figure 4:
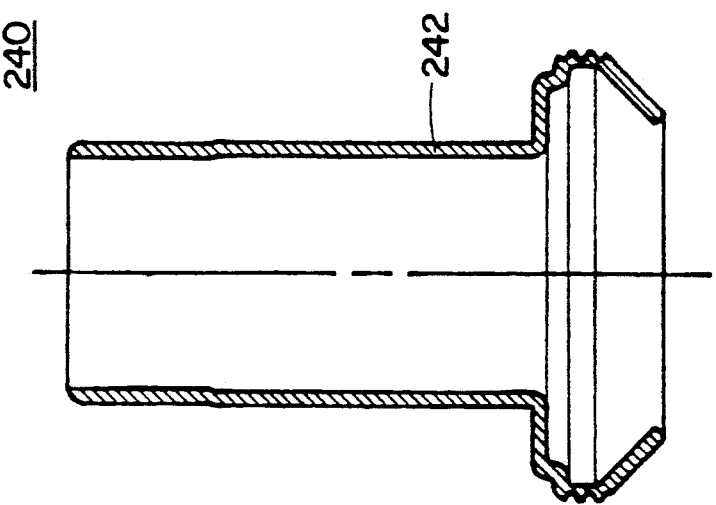
FIG. 4 is a cross-sectional view of a sleeve member used in the valves of FIGS. 2a and 2b.

FIGS. 2a, 2b and 4 illustrate sleeve assembly 240 which is utilized in the invention. FIG. 2a illustrates a directional control valve assembly with a secondary port 24 located in stop 43. FIG. 2b illustrates a normally closed solenoid valve with only input port 22 and output port 23 in body 20.

Sleeve member 242 of FIG. 4 has a first and a second end. The first end is flared or expanded with an annular thread located about the external surface of the flared end such that sleeve member 242 will mate with the threads in cup-like recess 25 of body 20. The bottom end of first end is re-coned inward below the annular thread, such that when sleeve assembly 240 is screwed into body 20, gasket 28 will be compressed between body 20 and sleeve assembly 240, thereby creating a seal between body 20 and sleeve assembly 240.

One example of a method of manufacture for sleeve member 242 of FIG. 4 utilizes a Waterbury Farrel eyelet machine and standard well-known in the art forming techniques. The Waterbury Farrel eyelet machine utilizes a roll of stainless steel strip-stock cut to a width of approximately 2¼ inches. The Waterbury Farrel eyelet machine utilizes a number of well known processes to those skilled in the art to produce sleeve member 242.

The first step is to punch the stainless steel strip-stock to form a cup roughly in the shape of the final sleeve member. The second step consists of cutting of the excess steel from the cup. The third step comprises punching a pattern at the beginning of the flared end in order that there is a means to grasp sleeve member 242 as you are screwing it into body 20. The fourth step comprises punching out a hole through the second end of sleeve member 242, followed by re-coning the flared end in order that a gasket seat may be obtained. The fifth step comprises removing the sharp edges and by coining the ends of sleeve member 242, followed by adding threads to the flared end of sleeve member 242 utilizing a Brown and Sharpe machine. The final step comprises welding stop 43 to the second end of sleeve member 242.

As the flared or expanded portion of the first end of sleeve assembly 240 is no longer a magnetic stainless steel, flux plate 241 of a magnetic material is placed over sleeve assembly 240 such that it is compressed between solenoid 10 and body 20 as shown in FIGS. 2a and 2b. By manufacturing sleeve assembly 240 out of two pieces versus three, the strength of sleeve assembly 240 is much greater than that of sleeve assembly 40 of FIG. 3. This increases both the strength and the life of the solenoid valve. Another advantage of the two piece solenoid valve is the potential cost savings. As weld 45 is now removed, assembly of the solenoid valve is cheaper and, therefore, less expensive.

I claim:

1. In an electrically operated valve comprising a body having inlet and outlet ports with inlet and outlet orifices in a threaded cup-like recess centered upon an axis, the inlet and outlet orifices providing for passage of fluid between the inlet and outlet ports, at least one orifice being perpendicular and centered upon the axis, the cup-like recess accommodating a sleeve member extending along said axis, the sleeve member containing a plunger of magnetic material having a closure member for closing the orifice located on the axis, and an electrical coil surrounding said sleeve member for actuating said plunger, wherein the improvement comprises:

a sleeve member comprising a tubular section having an enlarged first end integrally formed with the remainder of the tubular section and a second end, the enlarged end being formed with external threads which mate with the threads in the cup-like recess in the body, said tubular section being a nonmagnetic material which is screwed into said cup-like recess, said enlarged first end having a gasket seat for compressing a gasket between the cup-like recess and said sleeve member;

a stop welded to said second end of said tubular section forming a pressure seal, said stop comprising a magnetic material; and a flux plate comprising a magnetic material located about said sleeve member, between said electrical coil and said body, wherein said flux plate, said stop and said plunger form a path of low magnetic reluctance.

2. The electrically operated valve of claim 1 wherein said gasket seat is formed by re-coning said enlarged first end of said sleeve member.

3. The electrically operated valve of claim 1 wherein said sleeve member is constructed by the process of forming stainless steel sheet stock in a series of forming steps.

* * * * *